US009392002B2

(12) United States Patent
Suuronen et al.

(10) Patent No.: US 9,392,002 B2
(45) Date of Patent: Jul. 12, 2016

(54) SYSTEM AND METHOD OF PROVIDING VIRUS PROTECTION AT A GATEWAY

(75) Inventors: Janne Suuronen, Helsinki (FI); Martin Bergenwall, Espoo (FI)

(73) Assignee: Nokia Technologies Oy, Espoo (FI)

( * ) Notice: Subject to any disclaimer, the term of this patent is extended or adjusted under 35 U.S.C. 154(b) by 1889 days.

(21) Appl. No.: 10/059,182

(22) Filed: Jan. 31, 2002

(65) Prior Publication Data

US 2003/0145228 A1    Jul. 31, 2003

(51) Int. Cl.
*H04L 29/06* (2006.01)

(52) U.S. Cl.
CPC ........ *H04L 63/1408* (2013.01); *H04L 63/0227* (2013.01); *H04L 63/145* (2013.01)

(58) Field of Classification Search
CPC .................................................. H04L 63/1408
USPC ................. 713/154, 160, 164, 200, 201, 188; 380/286; 709/223–229, 245, 22–24; 726/11–13, 22–24
See application file for complete search history.

(56) References Cited

U.S. PATENT DOCUMENTS

| | | | |
|---|---|---|---|
| 3,396,723 A | 3/1966 | Freytag | |
| 4,558,413 A | 12/1985 | Schmidt et al. | |
| 4,714,992 A | 12/1987 | Gladney et al. | |
| 5,414,833 A | 5/1995 | Hershey et al. | 713/201 |
| 5,623,600 A | 4/1997 | Ji et al. | |
| 5,878,231 A * | 3/1999 | Baehr et al. | 709/245 |
| 5,948,104 A | 9/1999 | Gluck et al. | |
| 5,987,610 A | 11/1999 | Franczek et al. | |
| 6,035,423 A | 3/2000 | Hodges et al. | |
| 6,052,531 A | 4/2000 | Waldin et al. | |
| 6,119,165 A | 9/2000 | Li et al. | |
| 6,141,749 A * | 10/2000 | Coss et al. | 713/162 |
| 6,151,643 A | 11/2000 | Cheng et al. | |
| 6,167,407 A | 12/2000 | Nachenberg et al. | |
| 6,243,815 B1 * | 6/2001 | Antur et al. | 726/11 |
| 6,275,942 B1 | 8/2001 | Bernhard et al. | 713/201 |
| 6,397,335 B1 * | 5/2002 | Franczek et al. | 713/200 |
| 6,400,707 B1 * | 6/2002 | Baum | H04L 63/0263 370/352 |

(Continued)

FOREIGN PATENT DOCUMENTS

| | | |
|---|---|---|
| EP | 0909073 A | 4/1999 |
| WO | 0122686 A | 3/2001 |

OTHER PUBLICATIONS

Microsoft Press Computer Dictionary, 4th edition, Copyright 1999, p. 424.*

(Continued)

*Primary Examiner* — Bradley Holder
(74) *Attorney, Agent, or Firm* — Banner & Witcoff, Ltd.

(57) ABSTRACT

A system, a method for providing virus protection, and a computer program stored on a storage medium in a communication system including at least a first network coupled to a destination to which transmissions of data packets are made from the first network to the destination is described. A virus protection system includes a gateway, coupled between the first network and the destination, which includes a firewall which receives data packets and a virus scanning engine, coupled to the firewall, which receives the data packets after reception by the firewall, tests the data packets, passes any data packets, which are tested by the virus scanning engine to not contain a virus to the destination and discards any data packets which are tested by the virus scanning engine to contain a virus.

45 Claims, 3 Drawing Sheets

(56) References Cited

U.S. PATENT DOCUMENTS

| | | | | |
|---|---|---|---|---|
| 6,496,935 | B1* | 12/2002 | Fink | H04L 63/0254 370/451 |
| 6,519,703 | B1* | 2/2003 | Joyce | H04L 63/1408 706/46 |
| 6,578,147 | B1* | 6/2003 | Shanklin et al. | 726/22 |
| 6,633,985 | B2* | 10/2003 | Drell | 726/11 |
| 6,654,373 | B1* | 11/2003 | Maher, III et al. | 370/392 |
| 6,721,424 | B1* | 4/2004 | Radatti | 380/286 |
| 6,886,102 | B1* | 4/2005 | Lyle | 713/201 |
| 6,925,572 | B1* | 8/2005 | Amit et al. | 709/222 |
| 7,002,974 | B1* | 2/2006 | Deerman | H04L 12/5693 370/229 |
| 7,023,861 | B2* | 4/2006 | Makinson et al. | 370/401 |
| 7,047,561 | B1* | 5/2006 | Lee | 726/12 |
| 7,047,564 | B2* | 5/2006 | Cohen | 726/23 |
| 7,069,432 | B1* | 6/2006 | Tighe et al. | 713/151 |
| 7,076,650 | B1* | 7/2006 | Sonnenberg | 713/151 |
| 7,095,716 | B1* | 8/2006 | Ke et al. | 370/230 |
| 7,133,400 | B1* | 11/2006 | Henderson et al. | 370/389 |
| 2001/0039624 | A1* | 11/2001 | Kellum | 713/201 |
| 2002/0009198 | A1* | 1/2002 | Lipton | G06F 21/51 380/201 |
| 2002/0013911 | A1* | 1/2002 | Cordella et al. | 713/201 |
| 2002/0069356 | A1* | 6/2002 | Kim | 713/160 |
| 2002/0143948 | A1* | 10/2002 | Maher, III | H04L 47/2441 709/226 |
| 2002/0162026 | A1* | 10/2002 | Neuman et al. | 713/201 |
| 2003/0021280 | A1* | 1/2003 | Makinson et al. | 370/401 |
| 2003/0110379 | A1* | 6/2003 | Ylonen et al. | 713/164 |

OTHER PUBLICATIONS

Jeffay et al.; Beyond audio and video: multimedia networking support for distributed, immersive virtual environments; Published in: Euromicro Conference, 2001. Proceedings. 27th; Date of Conference: 2001; pp. 300-307; Meeting Date : Sep. 4-Sep. 6, 2001; IEEE Xplore.*

Floyd et al.; A reliable multicast framework for light-weight sessions and application level framing; Published in: Journal IEEE/ACM Transactions on Networking (TON) archive; vol. 5 Issue 6, Dec. 1997; pp. 784-803; 1997; ACM Digital Library.*

M. Cam, Intellectual Property Analysis of Symantec's Virus Definition Update Technology; Patently Obvious TM, Symantec's 2000 Annual Report, pp. 1-8.

Secure Network Solutions, Virus Protection with WebShield for Nokia Appliance, The WebShleld for Nokia Appliance v 4.2 as obtained at http://www.nokia.com/securitysoluctions/network/webshield.html Jan. 18, 2002, (2 pgs.).

EP Office Action dated Jan. 29, 2007 in Application No. 03 001 883.2.

EP Office Action dated Sep. 14, 2006 in Application No. 03 001 883.2; 3 pages.

Stallings, et al., "Cryptography and Network Security: Principles and Practice," Second Edition, 1999, pp. 514-533.

EP Search Report dated Nov. 19, 2004 in Application No. 03 001 883.2; 2 pages.

Office Action in European patent application No. 03001883.2-2413, dated Mar. 10, 2011.

* cited by examiner

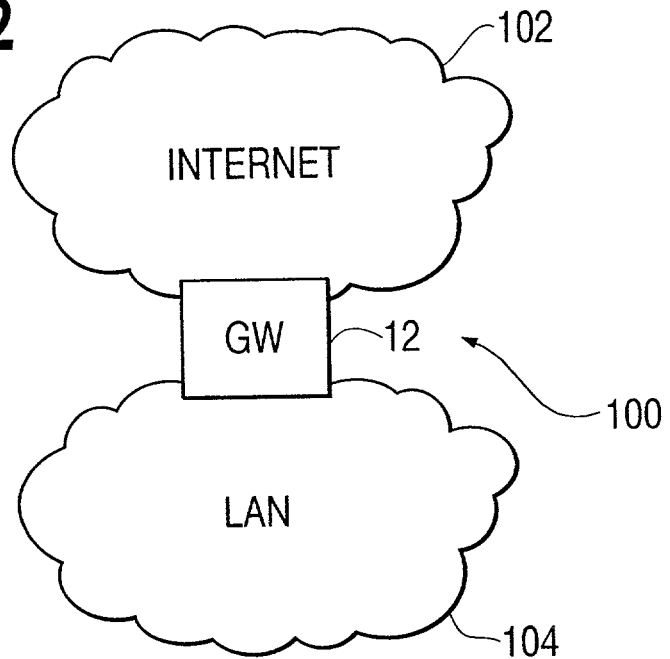
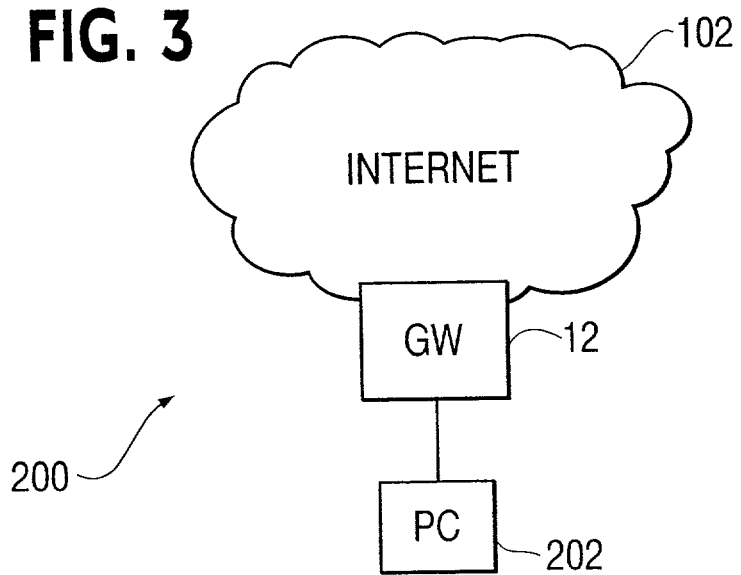

SYSTEM AND METHOD OF PROVIDING VIRUS PROTECTION AT A GATEWAY

BACKGROUND OF THE INVENTION

1. Field of the Invention

The present invention relates to systems and methods for detecting the presence of computer viruses in data transmissions to networks, and a computer program which when executed detects viruses in the data transmissions to the networks.

2. Description of the Prior Art

The Assignee of the present invention sells a Web Shield™ product for Nokia Appliance V.2 which is a dedicated system optimized with antivirus capability. McAfee® antiviral software is utilized therein to provide complementary protection to existing desktop solutions. The Web Shield™ stops viruses within data packets at a gateway to a network before penetrating the network. As a result, the deficiencies of prior art desktop and server-based antiviral systems, which degrade performance of multipurpose systems, is avoided with the attendant potential for the multipurpose systems being compromised being eliminated. The Web Shield™ provides an additional layer of protection to existing antiviral software resident on PCs or other computers including servers.

The Web Shield stops viruses and malicious code threats, updates the scanning engine automatically with the latest virus definition file, scans inbound and outbound traffic, cleans, rejects or quarantines infected attachments, and has a simple configuration and management.

U.S. Pat. Nos. 5,414,833, 5,623,600 and 6,275,942 disclose additional antivirus systems.

SUMMARY OF THE INVENTION

The present invention is a virus protection system, a method of providing virus protection which has an improved performance relative to the Web Shield™, and computer program stored on a storage medium for use in a virus scanning engine. The invention permits an early classification of the data packets so that it is possible to also route real-time traffic through a gateway which processes the data packets prior to testing with the virus scanning engine. The early classification improves the performance of the gateway. Furthermore, packets from the virus containing packet stream (or from the originating host) may easily be discarded by use of simple and fast firewall rules that are added when a virus is encountered. If viruses are found, the virus sending processor may be black listed so that no traffic from the virus sending processor passes the firewall in the future.

As used herein, the term "virus" includes any form of malicious executable code or malicious data threat including, but not limited to, "viruses" and "worms".

In accordance with the present invention, data packets are received by a firewall within a gateway at which they are tested and forwarded to a virus scanning engine. The virus scanning engine determines if the received data packets contain a virus. If so, the tested data packets are discarded and if not the tested data packets are forwarded to their destination to which the transmission of the data packets was made by a first network. Additionally, the firewall processes the received data packets in accordance with a packet classification criteria provided from a virus detection database to determine the presence of any data packets which cannot contain viruses, such as, but not limited to, audio and video stream data which are immediately forwarded to the destination so as to maintain real time data timing which is critical to data such as, but not limited to, audio and video streams. The virus scanning engine generates an alert which is transmitted to the firewall and the destination. The alert is utilized by the firewall to drop any data packets which are received in a data stream which has been determined to contain a virus. Additionally, the firewall may discard any other packets which are illegal for reasons other than the presence of a virus. A buffer storage is associated with the virus scanning engine which permits the data stream of packets to be sufficiently buffered in order to complete the necessary processing to determine the presence of a virus. Additionally, the virus scanning engine informs the destination of the data packets when the data packets are determined to contain a virus so as to prevent the destination from being infected with the virus. The virus scanning engine is coupled to a virus detection database which provides the necessary programming which is executed by at least one processor of the virus scanning engine for determining the presence of viruses in the data packets. Virus updates are provided to both the packet classification database and virus detection database so as to update the classification of the criteria used by the firewall to determine a first type of data packets which are immediately transmitted by the firewall to the destination for the reason that they are determined to not contain a virus and the second type of data packets which are forwarded from the firewall and received by the virus scanning engine at which they are tested to determine if they contain a virus. The virus detection database provides the latest antivirus detection programming to the at least one processor of virus scanning engine and may use any known type of anti-virus programming.

In a communication system including at least a first network coupled to a destination to which transmissions of the data packets are made from the first network to the destination, a system for providing virus protection in accordance with the invention includes a gateway coupled between the first network and the destination, which includes a firewall which receives the data packets and virus scanning engine, coupled to the firewall, which receives the data packets after reception by the firewall, tests the data packets, passes any data packets, which are tested to not contain a virus to the destination and discards any data packets which are tested o contain a virus. The firewall may classify the received data packets into packets of a first type which cannot contain a virus and second type which can contain a virus and may forward the data packets of the first type to the destination without testing by the virus scanning engine and may forward the data packets of the second type to the virus scanning engine for testing thereof. The virus scanning engine may test the data packets of the second type and may forward those data packets of the second type which are tested to not contain a virus to the destination. The data packets of the first type may contain real time data. The virus scanning engine may, when a virus is detected, alert the firewall that a virus has been detected which, in response to the alert, may stop reception of a data stream containing the data packets. A buffer may store the data packets of the second type while the virus scanning engine is processing the data packets of the second type to detect a virus. The firewall may drop any received data packets which are tested to be illegal according to firewall rules. A packet classification database, coupled to the firewall, may provide information to the firewall which defines the first and second types of data packets; and a virus detection database, coupled to the virus scanning engine, may provide programming controlling the testing of the data packets of the second type by the virus scanning engine. The virus scanning engine, upon detection of a virus in the data packets, may also alert the destination that a virus has been detected. The destination may be a local area network, a personal computer, or a second network. The first network may be a wide area network which may be the Internet. The first network may be the Internet; and the destination may comprise an Internet service provider coupled to the gateway, a modem coupled to the Internet service provider and one of a local area or personal computer coupled to the modem. The virus scanning engine may decode the data packets during determination if the data packets contain a virus. The virus scanning engine may function as a proxy for a destination processor which receives the data packets.

In a communication system including at least a first network coupled to a destination to which transmissions of data packets are made from the first network to the destination, a gateway coupled between the first network and the destination which includes a firewall which receives the data packets and a virus scanning engine, a method in accordance with the invention includes receiving the data packets at the firewall; transmitting the received data packets from the firewall to the virus scanning engine; testing the data packets with the virus scanning engine; and transmitting from the virus scanning engine any data packets which are tested by the virus scanning engine to not contain any virus to the destination and the discarding any data packets which are tested to contain a virus.

A computer program stored on a storage medium for use in a virus scanning engine in a communication system including at least a first network coupled to a destination to which transmissions of data packets are made from the first network to the destination, a gateway coupled between the first network and the destination, which includes a firewall which receives the data packets and the virus scanning engine, coupled to the firewall, which receives the data packets after reception by the firewall, passes any data packets, which are tested to not contain a virus to the destination and discards any data packets which are tested to contain a virus, in accordance with the invention when executed causes the virus scanning engine to execute at least one step of testing the data packets for the presence of a virus. The firewall may classify the received data packets into packets of a first type which cannot contain a virus and second type which can contain a virus and may forward the data packets of the first type to the destination without testing by the virus scanning engine and may forward the data packets of the second type to the virus scanning engine for testing thereof and wherein the computer program when executed causes the virus scanning engine to test the data packets of the second type and causes the virus scanning engine to forward those data packets which are tested to not contain a virus to the destination. The computer program when executed may cause the virus scanning engine to forward any data packets, which are tested to not contain a virus to the destination and may cause the virus scanning engine to discard any data packets which contain a virus. The data packets of the first type may contain real time data. The computer program, when executed, may cause the virus scanning engine, when a virus is detected, to alert the firewall that a virus has been detected which, in response to the alert, stops reception of a data stream containing the data packets. The firewall may drop any received data packets which are tested to be illegal according to firewall rules, a packet classification database may be coupled to the firewall which provides information to the firewall which defines the first and second types of data packets and a virus detection database may be coupled to the virus scanning engine and wherein the computer program controlling the testing of the data packets of the second type by the virus scanning engine may be provided by the virus detection database.

BRIEF DESCRIPTION OF THE DRAWINGS

FIG. 2 illustrates a block diagram of a first network in which the present invention may be practiced.

FIG. 3 illustrates a block diagram of a second network in which the present invention may be practiced.

Like reference numerals identify like parts throughout the drawings.

DESCRIPTION OF THE PREFERRED EMBODIMENTS

Figure 1:
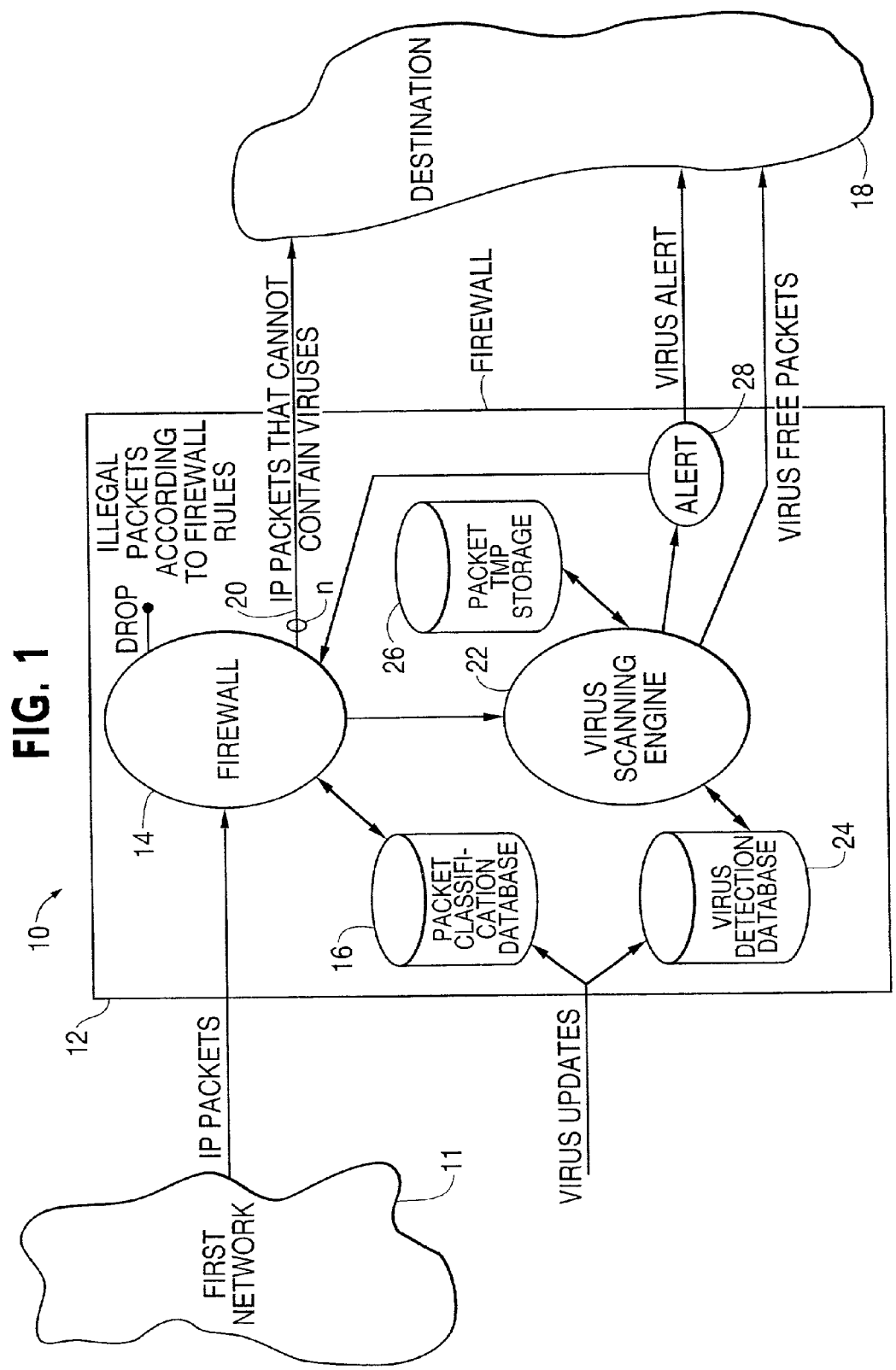
FIG. 1 illustrates a block diagram of an exemplary system in which the present invention may be practiced.

FIG. 1 illustrates a block diagram of a system 10 in which the present invention is practiced. A first network 11, which may be of any known design, provides data packets including, but not limited to, data packets transmitted by the TCP/IP protocol to a gateway 12 which includes a firewall 14 which may be of any known design that receives the data packets. The data packets received by the firewall 14 are processed in accordance with a packet classification criteria which is stored in a packet classification database 16. The data packets are classified by the firewall 12 into a first type of data packets which cannot contain a virus in accordance with criteria specified by the packet classification database 16 and typically without limitation represent real time data. Those data packets of the first type which are determined as not possibly containing a virus are transmitted from the firewall 14 to their destination 18 including, but not limited to, the destinations set forth in the network architectures of FIGS. 2-5 as described below. Without limitation, data packets of the first type, which are screened in accordance with the packet classification criteria provided by the packet classification database 16, are audio and video data streams. The output 20 is representative of n multiple ports from the firewall 14 with the payload of the data being provided on one or more output ports and further, additional information, not constituting the payload, which is used for setting up of the data transmission session being outputted on other ports 20. The firewall 14 forwards those data packets of the second type which may contain viruses to a virus scanning engine 22 of any known design at which at least one processor therein executes a computer program stored on any known type of storage medium as described below.

The processing of the data packets by the firewall 14 to divide them into first and second types provides an early classification of the packets so that real-time data traffic may be routed through the gateway to eliminate transmission of data packets to the virus scanning engine 22 which can reliably be determined to not contain viruses and which would slow down testing by the gateway 12 for viruses if forwarded to the virus scanning engine. Early classification improves the performance of the gateway 12 and further permits data packets from the virus containing packet stream (or from the originating host) to be readily discarded by use of simple and fast firewall rules that are added when a virus is encountered. If viruses are found, the virus sending processor may be black listed so that no traffic from the virus sending processor passes the firewall in the future.

The virus scanning engine 22 contains at least one processor which executes a program stored on a storage medium of any known type. The execution of the computer program causes processing of the data packets transmitted from the firewall 14 to the virus scanning engine 22 with virus detection criteria specified by virus detection database 24. The program may in addition control all facets of the operation of the virus scanning engine 22, as discussed below, including the reception of data packets of the second type from the firewall 14, the testing thereof, and the outputting of virus free packets and a virus alert to the firewall 14 and the destination 18 and control of communications between the virus detection database 24 and packet temporary storage 26. The virus detection database 24 is dynamically updated with virus updates which also update the packet classification database 16 to permit the criteria for screening the data packets into the first and second types to be dynamically varied to respond to changing or new viruses and data defining the first type or second types such as new types of data, which may be screened to determine that they do not contain viruses. The virus scanning engine 22 outputs the tested virus free data packets to the destination 18. A packet temporary storage 26 is associated with the virus scanning engine 22 to provide a buffer to permit storage of a sufficient number of data packets within a data stream being tested so as to permit determination if a data stream of data packets of the second type may be correctly determined to be virus free. If the virus scanning engine 22 detects the presence of a virus within the second type of data packets, an alert 28 is generated which is transmitted back to the firewall 14 and further to the destination 18. The alert 28, when transmitted to the firewall 14, provides a basis for instructing the firewall to drop data packets being received in the data stream which are determined to contain a virus. Additionally, the firewall 14 may drop data packets for other reasons in accordance with firewall rules. The main benefit of the firewall is to control and prevent outsiders from accessing the protected network (usually a LAN) behind the firewall. The data security inside the LAN does not have to be state-of-the-art if the firewall that connects the LAN, to the Internet or other wide area network, is robust. The firewall typically prevents data connections to be opened from the Internet or other wide area network and protects the machines in the LAN from different types of attacks (e.g. port scanning, Denial-of-Service attacks, etc.). The packet classification database 16 contains protocols, ports, packet lengths and other packet characteristics which are used collectively by the firewall 14 to perform the screening of the data packets so as to correctly identify those data packets of the first type which may be passed to the destination 18 on a real time basis and the data packets of the second type which are transmitted to the virus scanning engine 22 for testing for the presence of viruses. Additional information beyond that stored in the packet classification data base 16 may be used by the firewall 14 in determining if the received data packets are of the first type. As a result, real time video and audio streams and any other real time data which cannot contain viruses are not delayed by the virus scanning engine 22 so as to provide optimized performance. Moreover, eliminating data streams which contain data packets which are determined correctly as not being capable of containing viruses lessens the overhead on the testing process performed by the at least one processor executing the programming within virus scanning engine 22.

As a result of the splitting of the data packets into first and second types, which are respectively directly forwarded to the destination 18 and to the virus scanning engine 22, enhanced efficiency is obtained while permitting correct identification of data packets which contain viruses. Moreover, the packet temporary storage 26 has substantial capacity so as to permit a total data stream to be buffered when required for correct identification of a virus. But, in most applications, it is necessary only to test a much smaller number of data packets in while using the packet temporary storage 26 to determine whether the second type of data packets contain any viruses.

When the packet temporary storage 26 stores a total data stream, the virus scanning engine 22 acts as a proxy for the destination and may decode the data stream before forwarding to the destination 18. This may involve splitting of a TCP session or temporarily redirecting it to another location.

FIG. 2 illustrates a first network 100 in which the present invention may be practiced. The gateway 12 is coupled between the Internet 102 and a local area network 104.

FIG. 3 illustrates a second network 200 in which the present invention may be practiced. The gateway 12 is coupled between the Internet 102 and a PC 202.

Figure 4:
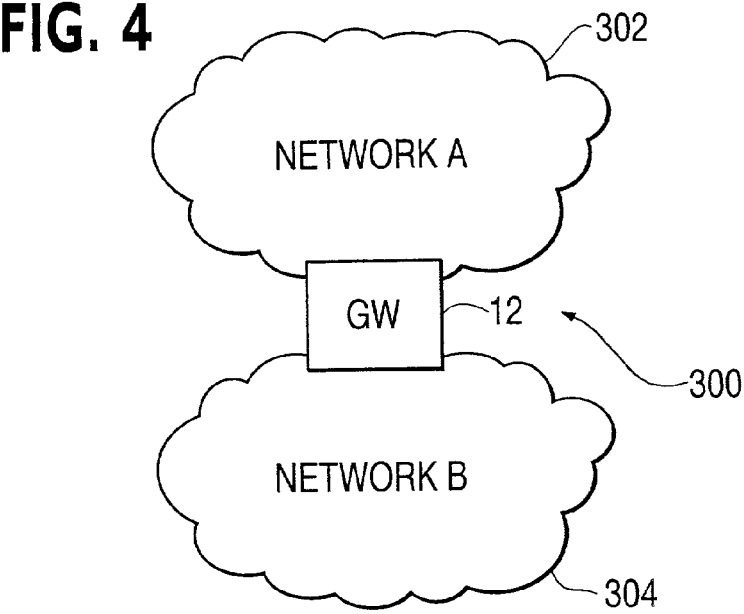
FIG. 4 illustrates a block diagram of a third network in which the present invention may be practiced.

FIG. 4 illustrates a third network 300 in which the present invention may be practiced. The gateway 12 is coupled between a first network of any known design 302 and a second network 304 of any known design.

Figure 5:
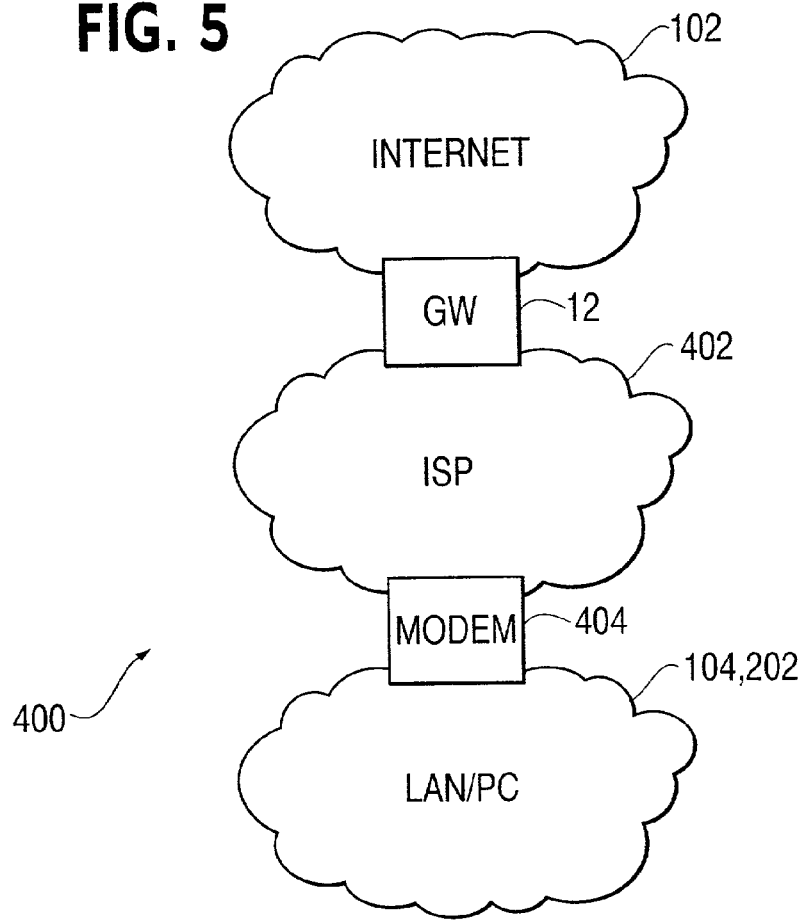
FIG. 5 illustrates a block diagram of a fourth network in which the present invention may be practiced therein.

FIG. 5 illustrates a fourth network 400 in which the present invention may be practiced. The gateway 12 is coupled between the Internet 102 and an Internet service provider 400. The Internet service provider 402 is coupled via modem 402 to one of a local area network or PC 104 and 202 respectively.

While the invention has been described in terms of its preferred embodiments, it should be understood that numerous modifications may be made thereto without departing from the spirit and scope of the present invention. It is intended that all such modifications fall within the scope of the appended claims.

The invention claimed is:

1. An apparatus comprising:
    a hardware firewall configured to
        receive a first data packet and a second data packet intended for a destination in networked communication with the hardware firewall;
        classify, responsive to a determination that the first data packet includes audio or video content, the first data packet as being a first type of data packet that cannot contain a virus;
        classify the second data packet as being a second type of data packet that can contain a virus;
        cause, responsive to classifying the first data packet as being the first type, transmission of the first data packet to the destination; and
        cause, responsive to classifying the second data packet as being the second type, transmission of the second data packet to a virus scanning engine for testing.

2. The apparatus of claim 1, wherein the determination that the first data packet includes audio or video content comprises a determination that the first data packet includes video content.

3. The apparatus of claim 2, wherein the determination that the first data packet includes audio or video content comprises a determination that the first data packet includes audio content.

4. The apparatus of claim 1, wherein the hardware firewall is configured to cause a stop in reception of a data stream which carried the first data packet and the second data packet in response to an alert from the virus scanning engine.

5. The apparatus of claim 1, further comprising a buffer configured to store the second data packet while the virus scanning engine is testing the second data packet to detect a virus, and wherein the hardware firewall is configured to cause the second data packet to be stored in the buffer.

6. The apparatus of claim 1, wherein the hardware firewall is configured to receive, from a packet classification database, information defining the first type and the second type.

7. The apparatus of claim 6, further comprising:
the virus scanning engine configured to receive, from a virus detection database, programming information that controls the testing of the second data packet by the virus scanning engine.

8. The apparatus of claim 1, further comprising:
the virus scanning engine configured to receive, from a virus detection database, programming information that controls the testing of the second data packet by the virus scanning engine.

9. The apparatus of claim 1, further comprising the virus scanning engine configured to cause transmission of an alert to the destination upon detection of a virus in the second data packet.

10. The apparatus of claim 1 wherein the destination is in networked communication with the hardware firewall via a local area network.

11. The apparatus of claim 10 wherein the destination is a personal computer.

12. The apparatus of claim 1, wherein the hardware firewall is configured to receive the first data packet and the second data packet via a first network, and wherein the destination is in networked communication with the hardware firewall via a second network.

13. The apparatus of claim 12, wherein the first network comprises a wide area network.

14. The apparatus of claim 12, wherein the first network comprises the Internet.

15. The apparatus of claim 1, wherein the destination comprises an Internet service provider configured to connect to a gateway.

16. The apparatus of claim 1, further comprising the virus scanning engine configured to decode the second data packet during the testing of the second data packet.

17. The apparatus of claim 16, wherein the virus scanning engine is configured to function as a proxy for a destination processor configured to receive data packets.

18. A method comprising:
receiving, by a computing device, a first data packet and a second data packet intended for a destination;
classifying, responsive to a determination that the first data packet includes audio or video content, the first data packet as being a first type of data packet that cannot contain a virus;
classifying the second data packet as being a second type of data packet that can contain a virus;
transmitting, responsive to classifying the first data packet as being the first type, the first data packet to the destination; and
transmitting, responsive to classifying the second data packet as being the second type, the second data packet to a virus scanning engine for testing.

19. The method of claim 18, wherein the determination that the first data packet includes audio or video content comprises a determination that the first data packet includes video content.

20. The method of claim 19, wherein the determination that the first data packet includes audio or video content comprises a determination that the first data packet includes audio content.

21. The method of claim 18, further comprising receiving, from a packet classification database, information defining the first type and the second type.

22. The method of claim 18, wherein classifying the first data packet as being the first type and classifying the second data packet as being the second type are both performed by a firewall.

23. One or more non-transitory computer readable media storing executable instructions that, when executed, cause an apparatus to:
receive a first data packet and a second data packet intended for a destination;
classify, responsive to a determination that the first data packet includes audio or video content, the first data packet as being a first type of data packet that cannot contain a virus;
classify the second data packet as being a second type of data packet that can contain a virus;
transmit, responsive to classifying the first data packet as being the first type, the first data packet to the destination; and
transmit, responsive to classifying the second data packet as being the second type, the second data packet to a virus scanning engine for testing.

24. The one or more non-transitory computer readable media of claim 23, wherein the determination that the first data packet includes audio or video content comprises a determination that the first data packet includes video content.

25. The one or more non-transitory computer readable media of claim 24, wherein the determination that the first data packet includes audio or video content comprises a determination that the first data packet includes audio content.

26. The one or more non-transitory computer readable media of claim 23, wherein the executable instructions, when executed, cause the apparatus to:
cause a stop in reception of a data stream which carried the first data packet and the second data packet in response to an alert from the virus scanning engine.

27. The one or more non-transitory computer readable media of claim 23, wherein the executable instructions, when executed, cause the apparatus to receive, from a packet classification database, information defining the first type and the second type.

28. The one or more non-transitory computer readable media of claim 23, wherein the apparatus comprises a firewall, wherein causing the apparatus to classify the first data packet as being the first type comprises causing the firewall to classify the first data packet as being the first type, and wherein causing the apparatus to classify the second data packet as being the second type comprises causing the firewall to classify the second data packet as being the second type.

29. An apparatus, comprising:
a processor; and
memory storing executable instructions that, when executed by the processor, cause the apparatus to at least:
receive a first data packet and a second data packet intended for a destination;
classify, responsive to a determination that the first data packet includes audio or video content, the first data packet as being a first type of data packet that cannot contain a virus;
classify the second data packet as being a second type of data packet that can contain a virus;
transmit, responsive to classifying the first data packet as being the first type, the first data packet to the destination; and
transmit, responsive to classifying the second data packet as being the second type, the second data packet to a virus scanning engine for testing.

30. The apparatus of claim 29, wherein the determination that the first data packet includes audio or video content comprises a determination that the first data packet includes video content.

31. The apparatus of claim 29, wherein the determination that the first data packet includes audio or video content comprises a determination that the first data packet includes audio content.

32. The apparatus of claim 29, wherein the executable instructions, when executed by the processor, cause the apparatus to:
cause a stop in reception of a data stream which carried the first data packet and the second data packet in response to an alert from the virus scanning engine.

33. The apparatus of claim 29, wherein the executable instructions, when executed by the processor, cause the apparatus to:
cause the second data packet to be stored in a buffer while the virus scanning engine is testing the second data packet to detect a virus.

34. The apparatus of claim 29, wherein the executable instructions, when executed by the processor, cause the apparatus to:
receive, from a packet classification database, information defining the first type and the second type.

35. The apparatus of claim 34, wherein the executable instructions, when executed by the processor, cause the apparatus to:
receive, from a virus detection database, programming information that controls the testing of the second data packet by the virus scanning engine.

36. The apparatus of claim 29, wherein the executable instructions, when executed by the processor, cause the apparatus to:
receive, from a virus detection database, programming information that controls the testing of the second data packet by the virus scanning engine.

37. The apparatus of claim 29, wherein the executable instructions, when executed by the processor, cause the apparatus to:
cause transmission of an alert to the destination upon detection of a virus in the second data packet.

38. The apparatus of claim 29 wherein the destination is in networked communication with the apparatus via a local area network.

39. The apparatus of claim 38 wherein the destination is a personal computer.

40. The apparatus of claim 29, wherein the executable instructions, when executed by the processor, cause the apparatus to:
receive the first data packet and the second data packet via a first network, and wherein the destination is in networked communication with the apparatus via a second network.

41. The apparatus of claim 40, wherein the first network comprises a wide area network.

42. The apparatus of claim 40, wherein the first network comprises the Internet.

43. The apparatus of claim 29, wherein the destination comprises an Internet service provider configured to connect to a gateway.

44. The apparatus of claim 29, wherein the executable instructions, when executed by the processor, cause the apparatus to:
decode the second data packet during the testing of the second data packet.

45. The apparatus of claim 44, wherein the executable instructions, when executed by the processor, cause the apparatus to:
operate the virus scanning engine to function as a proxy for a destination processor configured to receive data packets.

* * * * *